Nov. 9, 1937.  P. S. DICKEY  2,098,913
CONTROL SYSTEM
Filed Feb. 25, 1935

INVENTOR
PAUL S. DICKEY
BY
Raymond D. Junkins
ATTORNEY

Patented Nov. 9, 1937

2,098,913

UNITED STATES PATENT OFFICE 2,098,913

CONTROL SYSTEM

Paul S. Dickey, Cleveland, Ohio, assignor to Bailey Meter Company, a corporation of Delaware Application February 25, 1935, Serial No. 8,023

25 Claims. (Cl. 122—451)

This invention relates to control systems for establishing or maintaining constant any desired electrical, thermal, chemical, physical or other variable condition or relation of conditions through the control of a corrective agent, or agents. More particularly my invention relates to control systems wherein a fluid pressure is utilized as the motive power for actuating devices to control the rate of application of corrective agents.

It is an object of the invention to provide a control system wherein the condition under control is rapidly restored to a predetermined value, upon deviation therefrom, without over-travel or hunting.

A further object is to control the rate of application of a corrective agent, from the inter-relation of three variables, one of which may be a continuous indication of the rate of supply of the corrective agent.

Another object is to provide apparatus to which may be applied continuous representation of a plurality of variable conditions for obtaining a resultant to control a variable condition.

These and other objects will be apparent from the following description and the drawing in which.

Figures 1, 2:
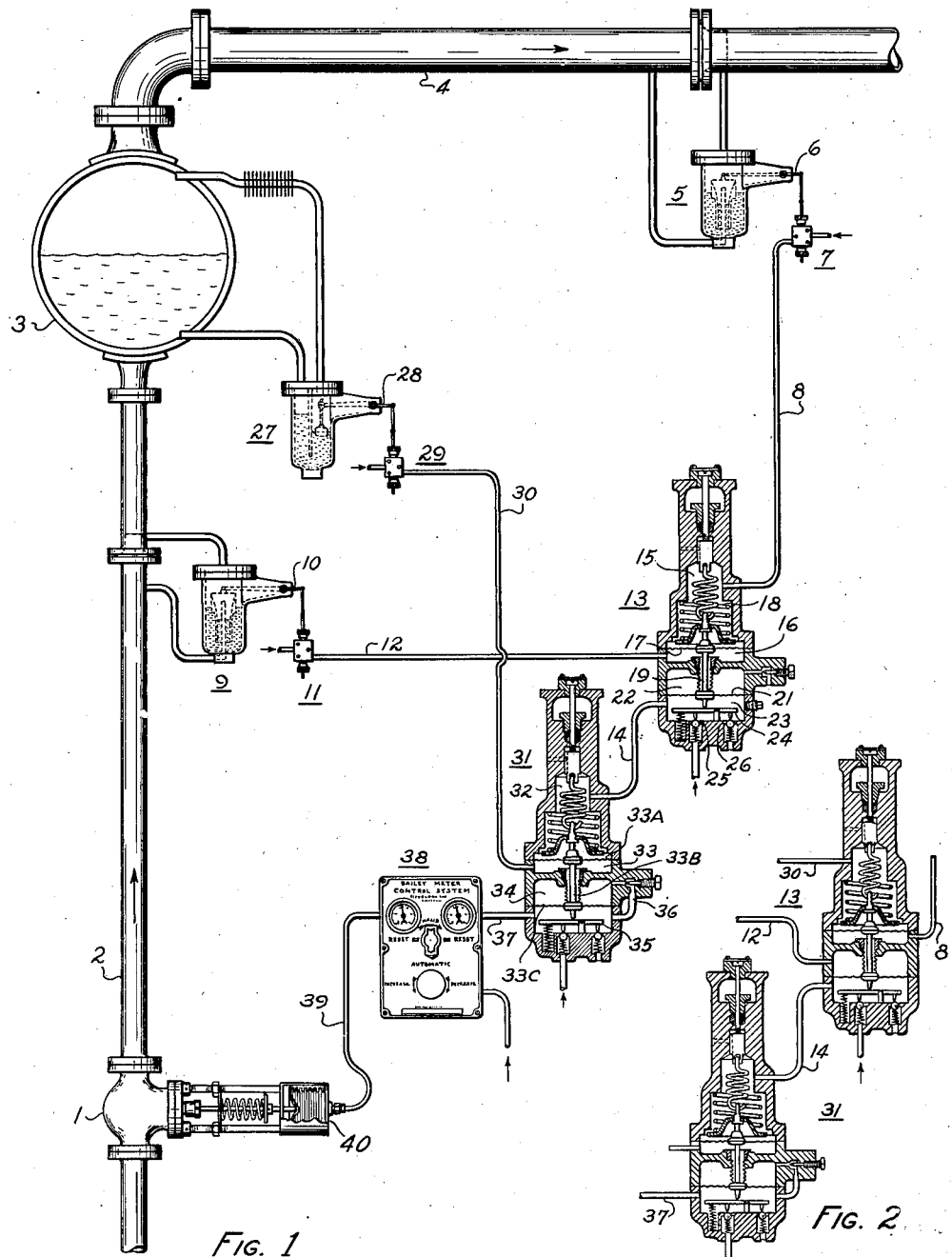
Fig. 1 is a diagrammatic representation of a control system embodying my invention.
Fig. 2 is a diagrammatic representation of a fragment of Fig. 1 with some modification.

I have chosen to illustrate and describe as a preferred embodiment of my invention a pneumatic control system adapted to continuously regulate the supply of liquid to a vapor generator responsive to three variable conditions of the operation of the vapor generator, such for example as the rate of liquid inflow, the rate of vapor outflow, and the liquid level within the vapor generator.

A valve 1 is located in a conduit 2 for the control of the supply of feed water to the steam and water drum 3 of a boiler (not shown), and a conduit 4 is provided for transmittal of steam from the drum 3 to a point of usage (not shown). The rate of steam flow through the conduit 4 is measured by a suitable flow meter 5 which may be of the type disclosed in Patent 1,123,164 to Bailey. The flow meter is provided with an arm 6 angularly positioned in accordance with the rate of flow of steam through the conduit 4 and adapted to position a pilot valve 7 to establish in the pipe 8 a fluid pressure (air pressure) varying in direct proportion to changes in the rate of flow of steam from the boiler. Similar means comprising a rate of flow meter 9, an arm 10, and a pilot 11 is provided for establishing a fluid pressure varying in direct proportion to changes in the rate of flow of feed water through the pipe 2; such fluid pressure (air pressure) applied through the pipe 12.

The pilot valves which I employ as a part of my control system may be of a type which form the subject matter of a patent to Clarence Johnson, No. 2,054,464, dated September 15, 1936, and wherein axial movement of a pilot stem in a pilot casing results in a pressure gradient at the outlet of the pilot casing in desired value relation to the said axial movement. For example, assuming a supply of air under pressure available at the pilot valve 7, then the pilot may be so shaped that a pressure gradient will be produced in the pipe 8 varying directly in value with the rate of flow of steam through the conduit 4. With such a pilot construction it is possible, if desired, to effect a pressure gradient varying inversely with the axial positioning of the pilot or in any desired relation thereto.

At 13 I indicate what I term an averaging relay, to which the pipes 8 and 12 lead, and from which a pipe 14 may lead to other apparatus. The pipe 8 communicates with a chamber 15, while the pipe 12 communicates with a chamber 16, the two separated by a flexible diaphragm 17. Pressures established by the pilot 7 and by the pilot 11 are therefore effective on opposite sides of the diaphragm 17.

The diaphragm is spring loaded by a spring 18 having adjustable means, and positions a movable member 19 which is further connected to a diaphragm 21 forming a movable partition between chambers 22, 23. Chamber 22 is open to the atmosphere while to the chamber 23 is connected the pipe 14.

Axial movement of the member 19 is adapted to position a fulcrumed spring loaded member 24 for actuation of the valves 25, 26. When the member 19 moves downwardly (on the drawing) valve 25 is opened to admit air under pressure to the chamber 23, while when the member 19 moves upwardly then valve 26 is opened to bleed air from the chamber 23 to the atmosphere. Thus axial movement of the member 19 from a predetermined neutral position will result in a variation in air pressure within the chamber 23.

The magnitude of the pressure maintained in chamber 23 for a given differential between chambers 15 and 16 may be brought to any desired value by manually adjusting the effective force of springs 18. In operation, upon an increase in the loading pressure within the chamber 15, due to an increase in the rate of flow of steam through the conduit 4, the movable member 19 will move downward allowing pressure fluid to enter the chamber 23 until the increase in pressure in this chamber balances the increase in pressure in the chamber 15, when the movable member 19 will be restored to the neutral position. Conversely upon an increase in the rate of flow of feed water through the conduit 2, the pressure within the chamber 16 will increase, causing the movable member 19 to move upward and allowing pressure fluid to exhaust from the chamber 23 until the decrease in pressure resulting therefrom in the chamber 23 is equal to or proportional to the increase in pressure within the chamber 16, when the movable member 19 will return to the neutral position. If the pressures within the chambers 15 and 16 increase or decrease in unison, there will be no change in the force acting upon the movable member 19 and the pressure within the chamber 23 will remain constant. The fluid pressure within the chamber 23 is therefore a measure of the differential in pressures existing within the chambers 15 and 16 and as these pressures are proportional to the rate of steam flow through the conduit 4 and the rate of water flow through the conduit 2, variations in pressure within the chamber 23 are inferentially a measure of the difference in rate of feed water to the boiler and rate of steam flow from the boiler.

When the rate of flow of feed water is equal to or in desired proportion to the rate of flow of steam, the pressure within the chamber 23 will be at some predetermined magnitude as established by adjustment of the springs 18. Should the steam flow be greater than the water flow the pressure in chamber 23 will increase and conversely should the steam flow decrease below the water flow, then the pressure in chamber 23 will decrease.

If the pressure established in the pipe 14 were used directly to control the valve 1 the tendency would be to maintain the rate of supply of feed water to the boiler equal to or in desired proportion to the rate of flow of steam from the boiler. In some installations such a system is entirely satisfactory, while in others due to inherent characteristics of the apparatus it is necessary to introduce a third variable. For example, the level of water within the steam separation drum 3. Such level will vary not only through deviation in ratio between steam outflow and water inflow, but also through loss of water from the boiler by leakage, blow down, blow off, etc. It is therefore often necessary in order to maintain the water level within the drum 3 within certain limits to modify the control of water inflow—steam outflow relation in accordance with variation in the actual water level. Such modification may operate to maintain a constant water level throughout the range in rating, or as is sometimes desired it may operate to maintain a water level varying in desired manner with rating.

I illustrate the control of water through the conduit 2 further modified in accordance with variations in the water level by establishing a pressure varying in desired manner with the water level. The apparatus comprises a mercury float actuated level indicator 27, having an arm 28 angularly positioned in accordance with variations in level, and for positioning a pilot valve 29 to establish in the pipe 30 a pressure proportional to water level.

In producing a final fluid pressure for regulating the positioning of the valve 1, I illustrate a standardizing relay 31 having overall characteristics such that upon deviation of the variable condition or relation of conditions from desired value there is initiated a primary corrective action immediately and continuously followed up by secondary corrective action in the same sense, but desirably at different speeds and/or sensitivity.

Certain features of the control system and apparatus disclosed herein by the drawing and description relating thereto, but not claimed herein, forms the subject matter of a co-pending application for Letters Patent of the United States filed concurrently herewith by Harvard H. Gorrie, Serial No. 8,047, to which reference may be had for a more detailed description.

Pressure established within the chamber 23 by the steam flow—water flow relation is transmitted through the pipe 14 to a chamber 32 of the device 31. Pressure established, representative of water level, at the pilot valve 29 is effective through a pipe 30 to the chamber 33. Chambers 32 and 33 are separated by a flexible diaphragm 33A to which is fastened a movable member 33B similar to the member 19 of the device 13.

Member 33B is further fastened to a second diaphragm 33C, separating chambers 34 and 35. Chamber 35 has an air supply port and an exhaust port similar to device 13 and the admission or exhaust of pressure in the chamber 35 is controlled primarily by axial positioning of member 33B responsive to pressure variations in chambers 32, 33. A pipe 37 leads from chamber 35 through a selector switch 38 and a pipe 39 to a fluid pressure motor 40 for positioning the valve 1. The selector switch 38 gives the possibility of positioning the valve 1 either by hand or under the control of the apparatus being described.

In operation, assuming the system to be in equilibrium, that is that the rate of flow of steam through the conduit 4 is equal to or in desired proportion to the rate of supply of water through the conduit 2, then upon an increase in the rate of steam flow the pressure within the chamber 15 will be increased producing a proportionate increase in the pressure within the chamber 23. Such pressure will be effective within the chamber 32 immediately effective for producing an initial increase in loading pressure within the chamber 35 and thereafter to produce a continuous increase in loading pressure within the chamber 35, effective for positioning the valve 1 in an opening direction to increase the rate of supply of water to the boiler. It is evident that an increase in pressure within the chamber 32, causing a downward movement of the member 33B will result in an increase in pressure immediately within the chamber 35. I have provided, as indicated at 36, a connection between the chambers 35 and 34, such connection equipped with a throttling device and adapted to effect a slow bleed between the chambers 35 and 34. Thus immediately upon an increase in pressure within the chamber 35 there begins a slow leakage of this increased pressure to the chamber 34 tending to bring the two into equilibrium. As such state of equilibrium is attained or approached, the counteracting effect of the pressure in the chamber 35 upon the previous downward positioning of the member 33B will be overcome and the increased pressure in chamber 32 will again be effective for downward positioning of member 33B. The pressure effective within the motor 40 will continue to increase due to the continuing increase in pressure within the chamber 35 until the rate of supply of feed water through the conduit 2 is again equal to or in desired proportion to the rate of steam outflow. When this condition obtains the loading pressure within the chamber 35 will remain constant until there is a further change in the pressure established within the chamber 23 due to some further departure of ratio between steam outflow and water feed.

If the chamber 33 were open to the atmosphere then the establishment of pressure within the chamber 35 would be as described. However by connecting to the chamber 33 a loading pressure representative of water level within the boiler I apply this loading pressure to possible movement of member 33B and thus the pressure within the chamber 35 is controlled, established, or varied, resultant from departure in water flow—steam flow relation from predetermined relation, and/or responsive to departure of water level from predetermined value.

The effect of the device 31 in general is to occasion an initial or primary change in the corrective agent substantially in unison with and in sense dependent upon changes in the magnitude of the controlled condition, or relation of conditions, and thereafter to occasion a continuing secondary change substantially proportional to the amount of and in sense dependent upon the deviation of the controlled condition or conditions from the desired magnitude; or in other words a control of relatively high sensitivity but low speed is superimposed upon a control of low sensitivity but high speed.

In general the illustration of Fig. 1 establishes a control of the rate of supply of water to the boiler responsive to rate of steam outflow, rate of water inflow, and water level. The fragment of the system illustrated at Fig. 2 shows a modification of the devices 13, 31 merely to the extent to which the different chambers are connected to other parts of the system and the pressures effective within the chambers.

In the representation of device 13 I have connected pipe 30 to chamber 15, pipe 8 to chamber 16, and pipe 12 to chamber 22. The pressure established within chamber 23 is therefore representative of the inter-relation between steam flow, water flow and water level, or the departure of value or relation of any or all of these variables from predetermined values.

The pressure established in chamber 23 is effective through pipe 14 to chamber 32 of device 31 effective in positioning the member 33B for controlling the pressure to operate the fluid pressure motor 40. The chamber 33 in this case being open to the atmosphere. In this representation the device 13 produces a loading pressure representative of the inter-relation of three variables.

It will be understood that should it be desired to maintain a level of water within the drum varying directly or inversely in some manner with rating, this may readily be accomplished by changing the relative motion and shape of the pilots for water flow and steam flow and relative to the pilot for water level which then has to come in and make up or subtract the difference.

It is to be understood that in general the apparatus which I have illustrated and described is representative only and that the features of the invention may be carried out equally as well with other types and arrangements of apparatus. Furthermore that the variables which I have chosen to use as illustrative are not limiting and I might equally as well have used variables such as temperature, pressure, specific gravity, electrical conductivity, or other variable conditions or relation of conditions in connection with which corrective agents are desirably controlled to maintain or establish values or relation of values.

While in the foregoing description I have used specific apparatus to illustrate the operation of my invention and have in cases resorted to certain specific examples to more clearly explain the principle of my invention, it is to be understood that I am not to be limited thereby, but that my invention is applicable to a wide variety of applications.

What I claim as new, and desire to secure by Letters Patent of the United States, is:

1. In a feed water control system, in combination, a fluid pressure relay having a casing defining a pair of chambers separated by a flexible partition, means responsive to rate of steam outflow for establishing a fluid pressure proportionate thereto in one of said chambers, means responsive to rate of water inflow for establishing a fluid pressure proportionate thereto in the other of said chambers, means positioned by the partition for establishing a third fluid pressure, and means responsive to the third fluid pressure for controlling water inflow.

2. In combination, a casing defining a pair of chambers separated by a flexible partition and a second pair of chambers separated by a second flexible partition, and means separately responsive to three variables for establishing a fluid pressure representative of each variable in three of said chambers, the two partitions adapted to move together and control a fluid pressure effective in the fourth chamber.

3. The method of controlling the operation of a vapor generator which includes, measuring the vapor outflow, measuring the liquid inflow, producing changes in a fluid pressure representative of the changes in the relation between such measures, initially varying the rate of liquid inflow in accordance with changes in the fluid pressure; and thereafter continuously varying the rate of liquid inflow until the fluid pressure attains a predetermined value.

4. The method of control which includes producing a first fluid pressure representative of the magnitude of a condition, producing a second fluid pressure representative of the rate of application of an agent affecting the condition, producing changes in a third fluid pressure representative of changes in the relation between the first two named fluid pressures, initially varying the rate of application of the agent in accordance with changes in the third fluid pressure; and thereafter continuously varying the rate of application of the agent until the third fluid pressure attains a predetermined value.

5. In a control system, in combination, means for producing a plurality of fluid pressures each representative of a variable condition, means sensitive to said fluid pressures for producing a resultant fluid pressure representative of the relation between said plurality of fluid pressures, and regulating means of a variable condition controlled by said resultant fluid pressure.

6. In combination, a casing defining a pair of chambers separated by a flexible partition, means for applying to one of said chambers a fluid pressure representative of one variable condition, means for applying to the other of the chambers a fluid pressure representative of another variable condition, means positioned with the flexible partition for establishing a third fluid pressure, and means controlled by said third fluid pressure for producing a fourth fluid pressure varying in accordance with the departure of the third fluid pressure from a predetermined value.

7. In combination, a casing defining a pair of chambers separated by a flexible partition, means for applying to one of said chambers a fluid pressure representative of one variable condition, means for applying to the other of the chambers a fluid pressure representative of another variable condition, means positioned with the flexible partition for establishing a third fluid pressure, and means controlled by the third fluid pressure for producing changes in a fourth fluid pressure proportional to changes in the third fluid pressure.

8. In combination, a casing defining a pair of chambers separated by a flexible partition and a second pair of chambers separated by a second flexible partition, means separately responsive to a variable for establishing a fluid pressure representative of each variable in two of said chambers, the two partitions adapted to move together and control a fluid pressure effective in the third chamber; and a sluggish connection between the third and fourth chamber whereby changes in pressure within the third chamber effect delayed pressure changes in the fourth chamber.

9. In a feed water control system, in combination, a casing defining a pair of chambers separated by a flexible partition, and a second pair of chambers separated by a second flexible partition, means separately responsive to fluid inflow, vapor outflow, and liquid level for establishing a fluid pressure representative of each variable in three of said chambers, the two partitions adapted to move each other and control a fluid pressure effective in the fourth chamber; and means under the control of said fourth fluid pressure for regulating the rate of liquid inflow.

10. In a feed water control system, in combination, means for producing a first fluid pressure in accordance with liquid inflow, means for producing a second fluid pressure in accordance with liquid level, means for producing a third fluid pressure in accordance with vapor outflow, means for producing changes in a fourth fluid pressure in accordance with changes in the relation between the first three named fluid pressures, and regulating means of the rate of liquid inflow controlled by the fourth fluid pressure.

11. In a feed water control system, in combination, means for producing a first fluid pressure in accordance with liquid inflow, means for producing a second fluid pressure in accordance with liquid level, means for producing a third fluid pressure in accordance with vapor outflow, means for producing primary variations in a fourth fluid pressure in accordance with changes in the relation between the first three named fluid pressures; means for thereafter producing further continuing changes in said fourth fluid pressure until the relation between said first three named fluid pressures is restored to a predetermined value, and regulating means of the rate of liquid inflow controlled by the fourth fluid pressure.

12. In a feed water control, in combination, means for producing a first fluid pressure in accordance with liquid inflow, means for producing a second fluid pressure in accordance with the liquid level, means for producing a third fluid pressure in accordance with vapor outflow, means for producing a fourth fluid pressure in accordance with the difference between the sum of the first and second named fluid pressures and the third named fluid pressure; and regulating means of the rate of liquid inflow controlled by the fourth fluid pressure.

13. A feed water control system for a vapor generator comprising in combination, means responsive to liquid inflow, means responsive to vapor outflow, means responsive to liquid level, means for determining the relationship between said first three named means, means responsive to said last named means for producing changes in the rate of feed water flow in accordance with changes in said relationship, and means for continuously changing the rate of feed water flow in accordance with the departure of said relationship from a desired relationship.

14. The method of controlling the rate of liquid inflow to a vapor generator to maintain the liquid level at a desired value which includes, changing the rate of liquid inflow substantially simultaneously and in accordance with changes in the liquid level and continuously changing the rate of liquid inflow in accordance with the amount of deviation of the instantaneous liquid level from the desired level.

15. The method of controlling the rate of liquid inflow to a vapor generator to maintain the liquid level at a desired value which includes, establishing changes in a fluid pressure in accordance with changes in liquid level in the vapor generator, continuously modifying the fluid pressure in accordance with the amount of deviation of the liquid level from a desired level, and controlling the rate of liquid inflow in accordance with the magnitude of the fluid pressure.

16. A feed water control system for a vapor generator to maintain the liquid level at a desired value, comprising in combination, means for producing changes in a fluid pressure in accordance with changes in liquid level, means for continuously modifying said fluid pressure at a rate in accordance with the deviation of the instantaneous liquid level from the desired level, means for regulating the rate of liquid inflow to said generator, and a fluid pressure motor for operating said last named means actuated by said fluid pressure.

17. A feed water control system for a vapor generator, comprising in combination, means for producing changes in a first fluid pressure in accordance with changes in liquid level, means for producing changes in a second fluid pressure in accordance with changes in the first fluid pressure, means for continuously changing said second fluid pressure at a rate proportional to the extent of departure of said first fluid pressure from a predetermined magnitude, and regulating means of the rate of liquid inflow controlled by said second fluid pressure.

18. A feed water control system comprising in combination, means responsive to liquid inflow, means responsive to vapor outflow, means responsive to liquid level, means for determining the relationship between said first three named means, means responsive to said last named means for producing changes in the rate of liquid inflow in sense dependent and in amount proportional to changes in said relationship, and means including at least a part of said last named means for continuously changing the rate of liquid inflow at a rate proportional to the amount of departure of said relationship from a desired relationship.

19. A feed water control system for a vapor generator, comprising in combination, means for producing changes in a first fluid pressure in accordance with changes in water level, means for producing changes in a second fluid pressure in accordance with changes in the first fluid pressure, means responsive to said second fluid pressure for continuously changing said second fluid pressure at a rate proportional to the extent of departure of said first fluid pressure from a predetermined magnitude, and regulating means of the rate of water inflow controlled by said second fluid pressure.

20. A feed water control system for a vapor generator comprising in combination, means for establishing a first fluid pressure in accordance with the rate of feed water flow, means for establishing a second fluid pressure in accordance with the liquid level, means under the control of the first fluid pressure to maintain the rate of feed water flow constant, and means under the control of the second fluid pressure for varying the constant rate maintained by the first fluid pressure.

21. A control system for varying the rate of application of an agent to maintain a condition at a desired value, comprising in combination, means for establishing a first fluid pressure in accordance with the rate of application of the agent, means for establishing a second fluid pressure in accordance with the magnitude of the condition, means under the control of the first fluid pressure to maintain the rate of application of the agent constant, and means under the control of the second fluid pressure for varying the constant rate of application maintained by said first fluid pressure.

22. In a control system for maintaining a condition at a desired value, in combination, means for producing variations in a first fluid pressure in accordance with changes in the rate of application of an agent effecting the condition, regulating means of the rate of application of the agent under the control of the first fluid pressure, means for establishing a second fluid pressure in accordance with the magnitude of the condition, and means under the control of the second fluid pressure for producing variations in the first fluid pressure.

23. A control system for varying the rate of application of an agent to maintain a condition at a desired value, comprising in combination, means for producing variations in a first fluid pressure in accordance with changes in the rate of application of the agent, means for producing variations in a second fluid pressure in accordance with changes in the magnitude of the condition, means for producing immediate changes in a third fluid pressure in accordance with changes in the difference between said first and second fluid pressures and for thereafter producing a continuing change in said third fluid pressure until said difference attains a predetermined value, and regulating means of the rate of application of said agent under the control of the third fluid pressure.

24. A control system for varying the rate of application of an agent to maintain a condition at a desired value, comprising in combination, means for producing variations in a first fluid pressure in accordance with changes in the rate of application of the agent, means for producing variations in a second fluid pressure in accordance with changes in the magnitude of the condition, a fluid pressure relay comprising a pair of chambers separated by a pressure sensitive diaphragm, means for applying to one of said chambers the first fluid pressure, means for applying to the other of said chambers the second fluid pressure, means positioned with the flexible diaphragm for establishing changes in a third fluid pressure proportional to changes in the difference between the first and second fluid pressures, and regulating means of the rate of application of the agent under the control of the third fluid pressure.

25. A control system for varying the rate of application of an agent to maintain a condition at a desired value, comprising in combination, means for producing variations in a first fluid pressure in accordance with changes in the rate of application of the agent, means for producing variations in a second fluid pressure in accordance with changes in the magnitude of a condition, a fluid pressure relay comprising a pair of chambers separated by a pressure sensitive diaphragm, means for applying to one of said chambers the first fluid pressure, means for applying to the other of the chambers the second fluid pressure, means positioned with the flexible diaphragm for establishing changes in a third fluid pressure proportional in magnitude to changes in the difference between the first and second fluid pressures, means including at least a part of said last named means for producing continuing changes in said third fluid pressure upon departure of the difference between the first and second pressures from a predetermined value, and regulating means of the rate of application of the agent under the control of the third fluid pressure.

PAUL S. DICKEY.